(12) United States Patent
Zhang

(10) Patent No.: US 8,048,957 B2
(45) Date of Patent: Nov. 1, 2011

(54) MODIFIER FOR POLYCARBONATE/ACRYLONITRILE-BUTADIENE-STYRENE BLENDS

(75) Inventor: David D. Zhang, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 260 days.

(21) Appl. No.: 12/469,216

(22) Filed: May 20, 2009

(65) Prior Publication Data

US 2009/0292083 A1    Nov. 26, 2009

Related U.S. Application Data

(60) Provisional application No. 61/054,838, filed on May 21, 2008.

(51) Int. Cl.
  *C08L 51/02*   (2006.01)
  *C08L 55/02*   (2006.01)
  *C08L 69/00*   (2006.01)

(52) U.S. Cl. ................. 525/63; 525/65; 525/67; 525/71

(58) Field of Classification Search .................... 525/63, 525/65, 67, 71

See application file for complete search history.

(56) References Cited

U.S. PATENT DOCUMENTS

| | | | |
|---|---|---|---|
| 3,130,177 A | | 4/1964 | Grabowski |
| 4,096,202 A | | 6/1978 | Farnham |
| 4,260,693 A | | 4/1981 | Liu |
| 4,390,657 A | | 6/1983 | Liu |
| 4,503,183 A | * | 3/1985 | Liu .............................. 524/504 |
| 4,696,972 A | | 9/1987 | Bourland |
| 4,745,143 A | * | 5/1988 | Mason et al. ................... 524/98 |
| 5,223,572 A | * | 6/1993 | Eckel et al. ..................... 525/67 |

FOREIGN PATENT DOCUMENTS

| | | | |
|---|---|---|---|
| CA | 2080356 | * | 10/1991 |
| DE | 3248709 | A1 | 4/1983 |
| EP | 0487067 | A2 | 5/1992 |
| EP | 0564242 | A1 | 10/1993 |
| WO | 03097743 | A2 | 11/2003 |
| WO | 2005042638 | A1 | 5/2005 |
| WO | 2006/001570 | A1 | 1/2006 |

* cited by examiner

*Primary Examiner* — Jeffrey Mullis

(57) ABSTRACT

Disclosed is a composition comprising a blend and a modifier in which the blend comprises polycarbonate and acrylonitrile/butadiene/styrene terpolymer and 15 weight % or less of a modifier wherein the modifier comprises an ethylene ester copolymer and either an acrylonitrile butadiene styrene block copolymer or a core-shell polymer. Also disclosed are shaped articles prepared from the composition.

6 Claims, No Drawings

MODIFIER FOR POLYCARBONATE/ACRYLONITRILE-BUTADIENE-STYRENE BLENDS

This application claims priority to U.S. provisional application No. 61/054,838, filed May 21, 2008, the entire disclosure of which is incorporated herein by reference.

This invention relates to modifiers for polycarbonate blends.

BACKGROUND OF THE INVENTION

It is generally known in the art to employ polycarbonate resins, which have excellent physical properties for molded and shaped articles but low thermoplasticity, with certain graft copolymers based on butadiene, acrylonitrile, and styrene to produce blends exhibiting thermoplastic properties (see, e.g., U.S. Pat. No. 3,130,177). These blends also may be less expensive than non-blended polycarbonate. The polycarbonate (PC) blends with acrylonitrile/butadiene/styrene (ABS) terpolymers are used in various applications. However, blends of this type can have problems with processibility, toughness, streaks, delamination, and low temperature performance.

It is also known that the impact strength of a high molecular weight polycarbonate can be improved by adding a combination of a methacrylate/acrylate copolymer and an olefin/alkyl acrylate copolymer (see, e.g., U.S. Pat. No. 4,260,693). In U.S. Pat. No. 4,390,657, the use of a multiphase composite interpolymer (see, e.g., U.S. Pat. No. 4,096,202) involving an methacrylate/acrylate copolymer with a small amount of a third crosslinking monomer and a graftlinking monomer, in the presence of a final rigid thermoplastic phase polymerized in the presence of these, is shown to improve the impact strength of a PC-ABS blend.

Modified PC-ABS blends with methylmethacrylate-butadiene-styrene (MBS) polymers to improve their impact strength have been disclosed (see, e.g., U.S. Pat. No. 4,696,972). Other impact modifiers include acrylonitrile/butadiene/styrene copolymers with high amounts of butadiene.

A PC-ABS blend having improved impact resistance can be achieved by the addition of an ethylene/alkyl acrylate ester copolymer or certain functionalized terpolymers thereof (see, e.g., WO2003/097743).

Copolymers comprising ethylene and alkyl acrylate or alkyl methacrylate monomers and terpolymers comprising ethylene, butyl acrylate, and glycidyl methacrylate have each been used as modifiers for toughening PC-ABS blends, but the composition obtained in either case can have delamination problems and streaks when used in an injection molding process. As a result, ethylene/alkyl(meth)acrylate copolymers, as PC-ABS modifiers, have problems when used in applications having a PC content of at least 50 weight %.

WO2005/042638 discloses PC-ABS blends modified with a blend of an ethylene/alkyl (meth)acrylate copolymer and an ethylene/butyl acrylate/glycidyl methacrylate terpolymer.

It is desirable to modify PC-ABS blends having greater than 50 weight % polycarbonate with a modifier that will improve at least one of the problem areas without detriment to other properties. For example, compositions with improved toughness, much better tensile properties and no delamination are desirable.

SUMMARY OF THE INVENTION

This invention provides a PC-ABS blend composition comprising, produced from, or consisting essentially of (1) a blend of polycarbonate and acrylonitrile/butadiene/styrene terpolymer having less than 40 weight % of butadiene in the terpolymer, preferably wherein polycarbonate is at least 50 weight % of the polycarbonate and acrylonitrile/butadiene/styrene terpolymer blend; and (2) from 0.1 to 15 weight % of a modifier combination, wherein the modifier combination comprises (i) an ethylene ester copolymer wherein the ethylene ester copolymer comprises (a) about 20 to about 95 weight % of copolymerized units of ethylene, (b) 0 to about 25 weight % of copolymerized units of at least one ester of the formula $CH_2=C(R^1)CO_2R^2$, wherein $R^1$ is hydrogen or an alkyl group having 1 to 6 carbon atoms, and $R^2$ is a glycidyl group, based on the total weight of the ethylene ester copolymer and (c) 0 to about 80 weight % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms; and either (ii) an acrylonitrile butadiene styrene block copolymer comprising at least 40 weight % butadiene, and optionally at least one additional comonomer selected from the group consisting of alky acrylates and alkyl methacrylates; or (iii) a core-shell polymer, preferably wherein the core comprises butadiene, polyalkyl acrylate, or a combination thereof, and optionally cross-linked; and the shell comprises polymethyl methacrylate, optionally containing functional groups selected from the group consisting of epoxy, carboxylic acid and amine.

This invention also provides a shaped article, for example an injection molded or thermoformed article, comprising the modified PC-ABS composition defined above.

The invention also provides a method for improving the impact resistance, tensile strength and elongation of a blend of polycarbonate and acrylonitrile/butadiene/styrene terpolymer having less than 40 weight % of butadiene in the terpolymer, the method comprising adding from 0.1 to 15 weight % of a modifier combination to the blend, wherein the modifier combination comprises (i) an ethylene ester copolymer wherein the ethylene ester copolymer comprises (a) about 20 to about 95 weight % of copolymerized units of ethylene, (b) 0 to about 25 weight % of copolymerized units of at least one ester of the formula $CH_2=C(R^1)CO_2R^2$, wherein $R^1$ is hydrogen or an alkyl group having 1 to 6 carbon atoms, and $R^2$ is a glycidyl group, based on the total weight of the ethylene ester copolymer and (c) 0 to about 80 weight % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms; and either (ii) an acrylonitrile butadiene styrene block copolymer comprising at least 40 weight % butadiene, and optionally at least one additional comonomer selected from the group consisting of alky acrylates and alkyl methacrylates; or (iii) a core-shell polymer, preferably wherein the core comprises butadiene, polyalkyl acrylate, or a combination thereof, and optionally cross-linked; and the shell comprises polymethyl methacrylate, optionally containing functional groups selected from the group consisting of epoxy, carboxylic acid and amine.

DETAILED DESCRIPTION OF THE INVENTION

In this disclosure, the term "copolymer" is used to refer to polymers containing two or more monomers. The use of the term terpolymer and/or termonomer means that the copolymer has at least three different comonomers. "Consisting essentially of" means that the recited components are essential, while smaller amounts of other components may be present to the extent that they do not detract from the operability of the present invention. The term "(meth)acrylic acid" refers to methacrylic acid and/or acrylic acid, inclusively. Likewise, the term "(meth)acrylate" means methacrylate and/or acrylate.

All references identified throughout this Specification including those in the Description of Related Art are incorporated by reference as if fully set forth herein.

The composition described herein has better toughness and much better tensile properties than unmodified PC-ABS compositions. Surprisingly, the combination of ethylene ester copolymer modifier and butadiene styrene copolymer modifier provides toughness (as indicated by notched Izod impact testing) comparable to that of either modifier alone, while providing much greater than expected tensile properties such as tensile strength and elongation. Without being bound by any theory, the combination appears to show synergism in these tensile properties.

The polycarbonate resins useful in component (a) are generally any such high molecular weight aromatic polycarbonate resins known in the art. Such commercial plastics with average molecular weight up to several hundred thousand are readily available. They may be prepared from diphenylolalkanes, of which the most common is 2,2-diphenylolpropane or bisphenol-A. Thus the polycarbonate resin may be derived from various dihydric phenols, such as 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-bis(3,5,3',5'-tetrachloro-4,4'-dihydroxyphenyl)propane, 2,2-bis(3,5,3',5'-tetrabromo-4,4'-dihydroxyphenyl)propane, (3,3'-dichloro-4,4'-dihydroxydiphenyl)methane, and mixtures thereof. Other dihydric phenols that are suitable for use in preparation of the polycarbonates are disclosed in U.S. Pat. Nos. 2,999,835, 3,028,365, 3,334,154, and 4,131,575.

These polycarbonates may be prepared by ester interchange in a melt of bisphenol-A (or the like) and an organic carbonate (e.g., diphenyl carbonate) under reduced pressure to effect the removal of phenol. Alternatively, a Schotten-Baumann reaction of bisphenol-A (dissolved in aqueous alkali plus a quaternary ammonium compound) at room temperature with phosgene in the presence of an organic solvent phase can be employed. Also, a homogeneous solution reaction using for example pyridine as both base and solvent may be employed. Other methods for preparation of the polycarbonate can be found in U.S. Pat. Nos. 4,018,750, 4,123,436, 3,153,008, and 3,169,131.

The acrylonitrile-butadiene-styrene resins useful in component (a) may be any such ABS plastics as known in the art, provided that they comprise less than 40 weight % of butadiene. Thus both the polyblend type ABS consisting essentially of a butadiene-based rubber (usually a nitrile rubber) physically dispersed in a styrene/acrylonitrile copolymer as well as the graft-copolymer mix type ABS consisting essentially of a butadiene-based rubber (usually polybutadiene) graft-copolymerized with styrene/acrylonitrile copolymer, along with ungrafted polybutadiene (which is physically dispersed in the styrene/acrylonitrile copolymer) are useful. Preferably, the graft copolymer mixes are used. For example, the ABS graft copolymer involves from 20 to 30 weight % of acrylonitrile, from 20 to 30 weight % of butadiene, and from 40 to 60 weight % of styrene, but individual applications outside these ranges are not uncommon. Such ABS resins can be manufactured by any of the methods generally practiced in the art. As such, light cross-linking (usually effected during the initial polymerization) restricts dissolution of the rubbery phase while graft copolymerization of polybutadiene improves its adhesion to the continuous phase of the copolymer.

It should be further appreciated that other analogous comonomers can be employed including various alkyl(meth)acrylates, dienes, and alkenyl aromatics in combination with or as replacement for one or more of the monomers of the acrylonitrile-butadiene-styrene resin.

The PC-ABS blends can comprise from about 1 weight % to about 99 weight % of polycarbonate and from about 99 weight % to about 1 weight % of ABS based on the combined weight of the PC and ABS in the blend. However, the most significant improvement obtained using a modifier as described herein can be observed when injection molding blends comprising at least about 50 weight % of polycarbonate in the combination of PC and ABS.

The ethylene ester copolymers useful in the modifier combination are polymers prepared by polymerization of ethylene and one or more ester comonomer(s). The ester comonomers may include esters of unsaturated acids having the formula (a) $CH_2{=}C(R^1)CO_2R^2$, where $R^1$ is hydrogen or an alkyl group having 1 to 6 carbon atoms and $R^2$ is a glycidyl group. The ester comonomers may also include esters of unsaturated acids having the formula (b) $CH_2{=}C(R^3)CO_2R^4$, where $R^3$ is hydrogen or an alkyl group having 1 to 8 carbon atoms and $R^4$ is an alkyl group having 1 to 8 carbon atoms. For example, ester comonomer (b) can be methyl, ethyl, or butyl methacrylate. Other useful ester comonomers include one or more of methyl acrylate, ethyl acrylate, n-butyl acrylate, tert-butyl acrylate, iso-butyl acrylate, and sec-butyl acrylate.

The ethylene ester copolymers may also be created by graft-copolymerization of the ester comonomer onto a previously polymerized ethylene copolymer.

The ethylene ester copolymer may comprise about 20 to about 95 weight %, about 20 to about 90 weight %, about 40 to about 90 weight %, or about 50 to about 80 weight %, of copolymerized units of ethylene based on the total weight of the ethylene ester copolymer. The ethylene ester copolymer may comprise about 0.5 to about 25 weight %, about 2 to about 20 weight %, or about 3 to about 17 weight %, of copolymerized units of an ester comonomer of formula (a), based on the total weight of the ethylene ester copolymer.

The ethylene ester copolymer may also comprise up to about 80 weight %, preferably about 3 to about 70 weight %, more preferably about 3 to about 40 weight %, even more preferably about 15 to about 35 weight %, and most preferably about 20 to about 35 weight %, of copolymerized units of an ester comonomer of formula (b) based on the total weight of the ethylene ester copolymer.

Specific examples of the ethylene ester copolymers include dipolymers produced by the copolymerization of ethylene and an alkyl acrylate or alkyl methacrylate such as methyl acrylate, ethyl acrylate or butyl acrylate. Specific examples of the ethylene ester copolymers include terpolymers produced by the copolymerization of ethylene, butyl acrylate, and glycidyl methacrylate, which are referred to as EBAGMA, and dipolymers produced by the copolymerization of ethylene and glycidyl methacrylate (EGMA). Additional comonomers may be present as copolymerized units in the ethylene copolymers. That is, the copolymers may be dipolymers, terpolymers or higher order copolymers. For example, the ethylene ester copolymers may additionally comprise other comonomers such as carbon monoxide. When present, copolymerized units of carbon monoxide generally will comprise up to about 20 weight %, or about 3 to about 15 weight % of the total weight of the ethylene ester copolymer.

The ethylene ester copolymers may be prepared by any suitable process. In particular, the ethylene ester copolymers may be prepared by polymerization of the foregoing monomers in the presence of a free-radical polymerization initiator at elevated temperatures (e.g, about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372; 3,756,996; 5,532,066; 5,543,233; and 5,571,878). The ethylene ester copolymers may be homogeneous or not. For example, the ethylene ester copolymers may not be homogeneous in terms of concentration of monomer units along the polymer chain due to imperfect mixing during polymerization or variable monomer concentrations during the course of the polymerization.

Preferably, the comonomer copolymerized with ethylene is selected from the group consisting of methyl acrylate, ethyl acrylate, n-butyl acrylate, glycidyl methacrylate and combinations thereof.

Preferably the ethylene ester copolymer is selected from the group consisting of ethylene/methyl acrylate dipolymer, ethylene/ethyl acrylate dipolymer, ethylene/n-butyl acrylate dipolymer, ethylene/glycidyl methacrylate dipolymer, ethylene/n-butyl acrylate/glycidyl methacrylate terpolymer, ethylene/n-butyl acrylate/carbon monoxide terpolymer and mixtures thereof.

An ethylene/glycidyl methacrylate dipolymer includes those comprising 0.5 to about 25 weight %, preferably about 2 to about 20 weight % of glycidyl methacrylate.

An ethylene/n-butyl acrylate/glycidyl methacrylate terpolymer includes those comprising 0.5 to about 25 weight %, preferably about 2 to about 20 weight % of glycidyl methacrylate, and 3 to about 40 weight % of n-butyl acrylate.

Preferably an ethylene/alkyl acrylate copolymer comprises from about 20 to about 30 weight % of methyl acrylate as the alkyl acrylate component. Suitable ethylene/alkyl acrylate copolymers, for example, comprise 24 weight % of methyl acrylate, 25 weight % of methyl acrylate or 30 weight % of methyl acrylate. Ethylene/alkyl acrylate copolymers are commercially available from E. I. du Pont de Nemours and Company (DuPont) under the ELVALOY AC tradename. Other ethylene alkyl acrylate copolymers may also be suitable.

The modifier combination may comprise (ii) an acrylonitrile butadiene styrene copolymer comprising at least 40 weight % butadiene, and optionally at least one additional comonomer selected from the group consisting of alky acrylates and alkyl methacrylates. For example, BLENDEX 338 is an acrylonitrile butadiene styrene terpolymer supplied by Chemtura Corporation (Middlebury, Conn.) nominally comprising 7.5 weight % of acrylonitrile, 70 weight % of butadiene and 22.5 weight % of styrene. BLENDEX 436 is reported to be a copolymer of acrylonitrile-butadiene-styrene-alkyl methacrylate in a ratio of 2/46/33/19.

Alternatively, the modifier combination may include (iii) a core-shell polymer. "Core-shell" as used herein denotes a compound comprising a soft (low-modulus) core comprising elastomer, elastomeric polymer, or rubber (these terms are used interchangeably), surrounded by a shell comprising a rigid polymer. Core-shell polymers used herein are generally described in "Core-Shell Impact Modifiers" [Carlos A. Cruz-Ramos, *Polymer Blends, Vol.* 2: *Performance,* 137- 75 (D. R. Paul & C. B. Bucknall eds., 2000)].

The low-modulus interior of the core-shell polymer compound comprises an elastomer, a compound with a glass transition temperature (Tg) of less than about 20° C. Preferably the Tg of the elastomer is less than about 0° C., and more preferably the Tg is less than about −20° C. Furthermore, the low-modulus interior is substantially noncrystalline, i.e., less than about 10% of the low-modulus interior is crystalline. The core preferably comprises butadiene and/or polyalkyl acrylate, such as polybutyl acrylate, and may be optionally cross-linked.

The shell comprises a rigid polymer, preferably with $T_g$ much higher than that of the core, which is chemically grafted onto the core. The shell of the core-shell polymer compound has two functions. First, the shell prevents the low-modulus interior of each core-shell polymer compound from adhering to the low-modulus interior of other core-shell polymer compounds. Second, when the core-shell polymer compound is dispersed in the PC-ABS blend, the shell physically binds the PC-ABS to the low-modulus interior of the core-shell polymer compound.

The shell of the core-shell polymer compound can comprise any non-elastomeric polymer, for example, polymethyl methacrylate, optionally containing functional groups such as epoxy, carboxylic acid, or amine. The non-elastomeric polymers are generally prepared from olefinic monomers by free radical polymerization.

Core-shell polymer compounds can be prepared by any of the methods known to one of ordinary skill in the art, for example, the methods described in U.S. Pat. Nos. 3,808,180 and 4,180,529. For example, a core-shell polymer compound can be prepared by emulsion polymerization in water or other suitable fluid medium with suitable initiators, first feeding in and polymerizing a monomer or set of monomers to form the core. Feeding in a second monomer or set of monomers then forms the shell. Though the predominant monomers contain a single polymerizable vinyl group, smaller quantities of monomers with multiple vinyl groups, such as butadiene, may optionally be used for preparation of core and/or shell. Emulsion polymerization produces core-shell polymer compounds of a well-defined size with a narrow size distribution, wherein each core-shell polymer compound is individually polymerized and optionally cross-linked during the synthesis process. The core-shell polymer compositions can retain their well-defined size and narrow size distribution even after dispersion in the PC-ABS blend, although they may be somewhat swollen by interaction with the PC-ABS blend. Preferred core-shell modifiers have maximum diameter of less than 0.5 μm, such as 0.2 to 0.3 μm, or no greater than 0.2 μm.

A core-shell polymer may also be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage. In one embodiment, the first stage of the polymerization produces a non-elastomer polymer, the second stage produces an elastomer polymer, and the third stage produces a non-elastomer polymer. In another embodiment, the first stage of the polymerization produces an elastomeric polymer, the second stage produces a non-elastomeric polymer, the third stage produces an elastomeric polymer, and the fourth stage produces a non-elastomeric polymer. In other embodiments, this process may be extended to five or more stages.

In a preferred embodiment, the core of the core-shell polymer comprises about 50 or 60 to about 90 or 95 weight % of the core-shell polymer, the percentages being based on the total weight of the core-shell polymer.

Preferred core shell polymers include those wherein the core-shell copolymer is prepared in two or more stages in which the core is about 50 to 90 parts by weight of polybutadiene or a copolymer of butadiene with up to 50% of at least one monomer selected from the group consisting of styrene, lower alkyl methacrylates, lower alkyl acrylates, acrylonitrile and olefins, and in which the shell is about 10 to 50 parts of a lower alkyl methacrylate with up to 50 percent of at least one monomer selected from the group consisting of styrene, acrylonitrile, and lower alkyl acrylates, with optional crosslinking and/or graftlinking monomers.

Core-shell polymer compounds can be obtained commercially, for example, PARALOID EXL-2330 (with a core prepared from butyl acrylate monomer), PARALOID EXL-2314 (epoxy functional polymer, with a core prepared from butyl acrylate monomer), and PARALOID KM-365 (with a core prepared from butyl acrylate monomer) from Rohm and Haas (Philadelphia, Pa.). Other suitable core-shell polymer compounds include those with butyl acrylate cores and polymethyl methacrylate shells, for example IM808A available from LG Chemicals (LG Twin Towers, 20, Yeouido-doing, Yeongdeungpo-gu, Seoul 150-721, South Korea), and those with acrylic rubber cores, for example, METABLEND W 330A available from Mitsubishi Rayon America Inc., 747 Third Avenue, New York, N.Y. Other suitable core-shell polymers include KM330, a methyl methacrylate-butyl acrylate copolymer supplied by Rohm and Haas.

Of note are such core-shell polymers known as methylmethacrylate butadiene styrene copolymers or MBS polymers. The MBS polymer can also have the relationship of the core to the shell reversed.

Methods for the production of MBS polymers are known. For example, see Example I of U.S. Pat. No. 3,985,704.

Particularly suitable MBS polymers include: METABLEND C Series Impact Modifiers (C-202, C-201, C-102C and C-223) commercially available from M&T Chemicals Inc.; DURASTRENGTH 200 Impact Modifier also available from M&T Chemicals Inc.; ACRYLOID KM Series impact modifiers (KM 581, KM 653, KM 436 and KM 680) or PARALOID impact modifiers available from Rohm & Haas Chemical Company; and Kane ACE (B-22 and B-56) impact modifiers available from Kaneka America. Of note is MBS polymer PARALOID 3691 available from Rohm & Haas. Mixtures of MBS polymers can be employed in the modified PC-ABS blends.

The modifier combinations can comprise from about 10 weight % to about 90 weight % of the ethylene ester component, and more preferably from about 40 weight % to about 85 weight % of the ethylene ester component. Most preferably the blend comprises from about 60 weight % to about 80 weight % of the ethylene ester component. The modifier combination is included in the PC-ABS blend in an amount of about 0.1 to about 15 weight %, based on the total weight of the modified PC-ABS blend. Preferably, the modifier combination is present in an amount of 7 weight % or less, more preferably 5 weight % or less. Higher levels of modifier may tend to coarsen the additive domain and lower the performance of the blend in injection-molded articles.

The modifier combination of ethylene ester copolymer and either acrylonitrile butadiene styrene block copolymer or core-shell polymer can be added to the PC-ABS composition as individual components. When added as individual components, the ethylene ester copolymer can be added to the PC-ABS composition in from about 0.01 to about 13.5 weight % and either acrylonitrile butadiene styrene block copolymer or core-shell polymer can be added to the PC-ABS composition in from about 0.01 to about 13.5 weight %, such that the modifier combination is present in the PC-ABS composition in from about 0.1 to about 15 weight %. It is desirable that the components of the modifier combination when added individually are in amounts such that the combination comprises about 10 weight % to about 90 weight % of the ethylene ester component, preferably from about 40 weight % to about 85 weight % of the ethylene ester component, more preferably from about 60 weight % to about 80 weight % of the ethylene ester component.

Alternatively, the components of the modifier combination can be mixed and the combination then added to the PC-ABS composition. The components can be dry-blended, for example as a salt-and-pepper pellet blend, or they may be melt-blended and formed into pellets or the like for addition to the PC-ABS composition.

Other components may be included in the modifier combination depending on their utility and benefit in the application described. However not all components are innocuous when included in the blends, and the deleterious effects that can result should be considered as well as the benefits.

The modified PC-ABS blend may be obtained by combining the component materials using any melt-mixing method known in the art. For example: 1) the component materials may be mixed using a melt-mixer such as a single or twin-screw extruder, blender, kneader, Banbury mixer, roll mixer, etc., to give the modified composition; or 2) a portion of the component materials can be mixed in a melt-mixer, and the rest of the component materials subsequently added and further melt-mixed.

After blending, the composition can be processed directly into a finished shaped article by virtually any method of extrusion processing or thermoforming known to those skilled in this art. For example, extrusion molding, coextrusion molding, injection molding, coinjection molding, compression molding, overmolding, profile extrusion, extrusion lamination, extrusion coating, cast film or sheet extrusion or coextrusion, or the like can be used. Injection molded articles are of note.

In addition, the shaped articles may comprise material other than the modified PC-ABS blend, such as layers of polymeric material other than the modified PC-ABS blend, or nonpolymeric substrates. For example, articles can be prepared by coinjection molding wherein two melts streams are injected into a mold in such a way that one polymer (often, the more expensive and/or more functional polymer) is on the exterior of the article while the lower cost, lower performing polymer is in the interior. Overmolding of a substrate such as a metal insert, shaped polymeric part or combination thereof with the modified polyester also produces shaped articles comprising an outer layer of the modified polyester.

Various additives as generally practiced in the art can be present in the respective layers including the presence of tie layers and the like, provided their presence does not substantially alter the properties of the article. Thus, it is contemplated that various additives such as antioxidants and thermal stabilizers, ultraviolet (UV) light stabilizers, pigments and dyes, fillers, delustrants, anti-slip agents, plasticizers, other processing aids, and the like may be employed in the other layers.

The modifier combinations are useful for lowering the viscosity of PC-ABS blends used in injection molding, and reducing defects such as delamination and streaking in parts molded from PC-ABS blends. The desired improvement in impact resistance for the resulting blend will be in part a function of the amount of ethylene ester copolymer employed and the relative amount and type of ester comonomer present in the copolymer. Delamination and streaking can also be affected by the amount of ABS having greater than 40% butadiene or the amount of core shell polymer (e.g. MBS) present in the modifier blends.

Using ethylene ester copolymer (e.g. ethylene methyl acrylate copolymer) alone can provide molded parts with improved tensile and impact properties. However, streaks and delamination can occur in a molded PC-ABS when using such a modifier. No delamination is observed when ABS (greater than 40% butadiene) or MBS is used as a modifier in PC-ABS blend.

We saw a synergistic effect using a combination of ethylene ester copolymer such as ethylene methyl acrylate copolymer and either MBS or ABS (greater than 40% butadiene). Blends prepared using the modifier blend described herein not only exhibit improved impact properties, they also eliminate delamination and provide much better elongational properties than when using either ethylene methyl acrylate copolymers or MBS or ABS (greater than 40% butadiene) separately.

Shaped articles can also be prepared by thermoforming processes. Thermoformed articles typically have a shape in which a sheet of material forms a concave surface such as a tray, cup, can, bucket, tub, box or bowl. Typically, a flat sheet is heated, for example by a 315° C. black-body radiator from above and below the sheet during a 30 to 40-second dwell time, during which time the surface temperature of the sheet may rise toward the nominal forming temperature of polypropylene of 165° C. At the end of the heat-cycle the sheet is immediately positioned over an unheated, optionally cooled cavity mold and clamped to the mold perimeter. Vacuum from within the mold during a short period (e.g. two seconds) draws the sheet into the mold. After a cooling period the thermoformed article is ejected from the mold. Alternatively, a plug may force the softened sheet into the cavity mold. Either method provides an article in which the sheet is stretched or drawn into a shape having a thinner cross-section and a greater surface area than the sheet had originally.

Thermoformed articles as described above are often used as containers for packaging various consumer goods. Other articles, such as toys, panels, furniture and automotive parts may also be prepared similarly.

Accordingly, in another embodiment, the invention provides a shaped article comprising the modified PC-ABS blends described herein. These modified PC-ABS blends can be used in applications where PC-ABS blends are conventionally used to make injection molded parts. For example, the blends can be used: in parts for the computer industry such as casings for keyboards, keyboard keypad, printers, scanners, computer monitors, computer casings, and other computer peripherals; for parts useful in the transportation industry including the automobile industry, aircraft industry, shipping/boating industry, and railroad industry, as body panels or parts, seats, accessories, instrument panels and the like; in appliances such as ovens including conventional ovens and microwave ovens, refrigerators, dish washers, freezers, washers, dryers; in home entertainment systems including televisions, video cassette players and recorders, digital video players and recorders, compact disc players, and the like; telephones and cellular phone parts including the body, the handset, the keypad; toys, sporting equipment, and many other applications where PC-ABS blends find use.

EXAMPLES

The Examples are for illustrative purposes only, and are not intended to limit the scope of the invention.

Materials Used
PC-1: CALIBRE 210-10 commercially available from Dow Chemical.
ABS-1: MAGNUM AG700 commercially available from Dow Chemical.
CS-1: PARALOID 3691 commercially available from Rohm Hass.
CS-2: BLENDEX 338 commercially available from Chemtura.
EMA-1: An ethylene/methyl acrylate copolymer having 24 weight % of methyl acrylate.
F-1: n EBAGMA copolymer having 28% weight % butyl acrylate and 5.25 weight % glycidyl methacrylate.

A blend of PC-1 and ABS-1 in a ratio of 70:30 was compounded using a 30 mm W&P twin screw extruder (200 rpm) at a temperature of 290° C. (Comparative Example C1).

The other blends as summarized in Table 1 were prepared by blending PC-1 and ABS-1 in a ratio of 70:30 with the various modifiers added as individual components. All the blends were made on a 30 mm W&P corotating twin screw machine at 200 rpm screw speed and melt temperature of 290° C.

Plaques of each composition were injection molded at from 270 to 280° C., using a fast injection rate. Notched Izod (ft-lb/in) was determined at 23° C. using ASTM procedure D256. Tensile Strength and Tensile Elongation were determined at 23° C. using ASTM procedure D638. The results are reported in Table 1. The "expected" values were calculated by finding the slope of the data with each of the modifiers individually and then using the formula of the fitted line to get the value expected if the property was a simple linear combination of the two modifiers. As can be seen by inspection of Table 1, tensile strength and elongation were greater than expected for the modifier blends of the invention. Delamination was assessed qualitatively by checking the tensile specimen after the tensile test.

TABLE 1

| | Example | | | | | | |
|---|---|---|---|---|---|---|---|
| | C1 | C2 | C3 | C4 | C5 | 1 | 2 |
| PC-1 | 70 | 66.5 | 66.5 | 66.5 | 66.5 | 66.5 | 66.5 |
| ABS-1 | 30 | 28.5 | 28.5 | 28.5 | 28.5 | 28.5 | 28.5 |
| CS-1 | 0 | 5 | 0 | 0 | 0 | 2 | 0 |
| CS-2 | 0 | 0 | 5 | 0 | 0 | 0 | 2 |
| EMA-1 | 0 | 0 | 0 | 5 | 3.5 | 3 | 3 |
| F-1 | 0 | 0 | 0 | 0 | 1.5 | 0 | 0 |
| Izod Impact (ft-lb/in) | 13.7 | 12.9 | 16.4 | 19 | 16.5 | 16.3 | 17.8 |
| Tensile Strength (MPa) | | | | | | | |
| measured | 51 | 54 | 47 | 53 | 51 | 59 | 59 |
| expected | — | — | — | — | — | 53.4 | 50.6 |
| Elongation (%) | | | | | | | |
| measured | 61 | 74 | 54 | 89 | 81 | 113 | 112 |
| expected | — | — | — | — | — | 83 | 75 |
| Delamination | N | N | N | Y | Y | N | N |

The invention claimed is:
1. A composition comprising a blend and a modifier wherein
the blend is a combination of polycarbonate and acrylonitrile butadiene styrene terpolymer and has less than 40 weight % of butadiene in the terpolymer;

the modifier is present in the composition from 0.1 to 15%, by weight of the composition;

the modifier is a mixture of an ethylene ester copolymer and an acrylonitrile butadiene styrene block copolymer;

the ethylene ester copolymer comprises, based on the total weight of the ethylene ester copolymer, (a) about 20 to about 95 weight % of copolymerized units of ethylene, (b) 0 to about 25 weight % of copolymerized units of at least one ester of the formula $CH_2=C(R^1)CO_2R^2$, wherein $R^1$ is hydrogen or an alkyl group having 1 to 6 carbon atoms, and $R^2$ is a glycidyl group, and (c) 0 to about 80 weight % of copolymerized units of at least one ester of the formula $CH_2=C(R^3)CO_2R^4$, wherein $R^3$ is hydrogen or a methyl group and $R^4$ is a methyl group; and the acrylonitrile butadiene styrene block copolymer comprises at least 40 weight % of butadiene, and optionally at least one additional comonomer selected from the group consisting of alky acrylates and alkyl methacrylates.

2. The composition of claim 1 wherein the modifier further comprises a core-shell polymer; the core of the core-shell polymer is butadiene, butadiene styrene, polyalkyl acrylate, or combination of two or more thereof and is optionally cross-linked; and the shell of the core-shell polymer is polymethyl methacrylate, optionally containing functional groups including epoxy, carboxylic acid, or amine.

3. An article comprising or produced from a composition wherein the composition is as recited in claim 1.

4. The article of claim 3 wherein the modifier is present in the composition at 5 weight % or less.

5. A process comprising combining from 0.1 to 15 weight % of a modifier to a blend wherein the process is effective to improve the impact resistance, tensile strength, or elongation of the blend; the blend and the modifier are each as recited in claim 1.

6. The process of claim 5 wherein the modifier is present in the composition at 5 weight % or less.

* * * * *